United States Patent [19]

DiBartolo

[11] Patent Number: 4,834,135
[45] Date of Patent: May 30, 1989

[54] PRESSURE CONTROL VALVE

[75] Inventor: Ernest A. DiBartolo, Sarasota, Fla.

[73] Assignee: Sun Hydraulics Corp., Sarasota, Fla.

[21] Appl. No.: 266,168

[22] Filed: Nov. 1, 1988

[51] Int. Cl.$^4$ ............................................. F16K 21/10
[52] U.S. Cl. ............................... 137/514.5; 137/522; 137/469; 137/493.9; 251/282
[58] Field of Search .................... 137/514.5, 522, 469, 137/493, 493.9, 508; 251/282

[56] References Cited

U.S. PATENT DOCUMENTS

| | | | |
|---|---|---|---|
| 4,428,396 | 1/1984 | Wall | 137/493.9 |
| 4,591,314 | 5/1986 | Weber | 137/522 X |
| 4,597,410 | 7/1986 | Wilke | 137/493.9 X |
| 4,742,846 | 5/1988 | DiBartolo | 137/514.5 |

Primary Examiner—John Rivell
Attorney, Agent, or Firm—Charles J. Prescott; Raymond H. Quist

[57] ABSTRACT

Two pressure control valves have most components in common. One valve is a direct-acting sequence valve and the other a vented counterbalance valve with pilot assist. Both valves have a set opening pressure which is insensitive to secondary port pressure. Both valves may provide free reverse flow. The valves include a spring force reduction chamber which receives hydraulic fluid at primary port pressure. Part of the opening force exerted at the primary port is offset by pressure in the spring force reduction chamber so that a spring having a smaller spring constant may be used to resist opening force. This offsetting force may be readily modified by changing the diameter of the piston shaft of the valve.

16 Claims, 1 Drawing Sheet

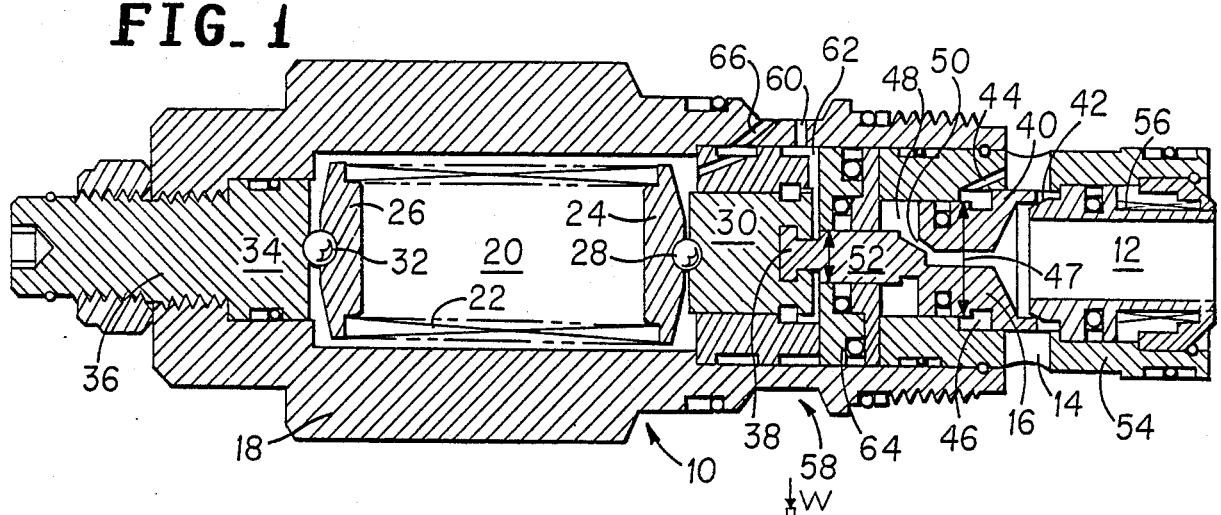
FIG_1
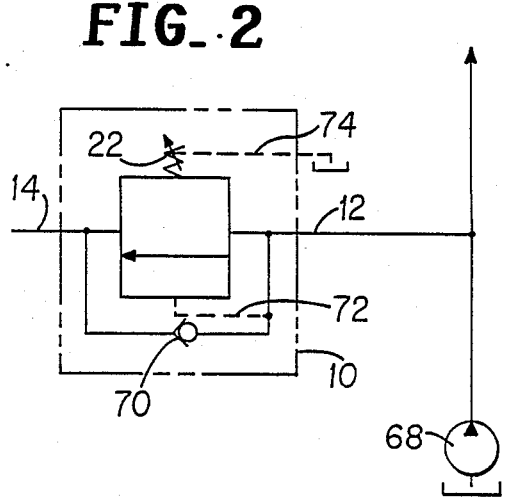
FIG_2
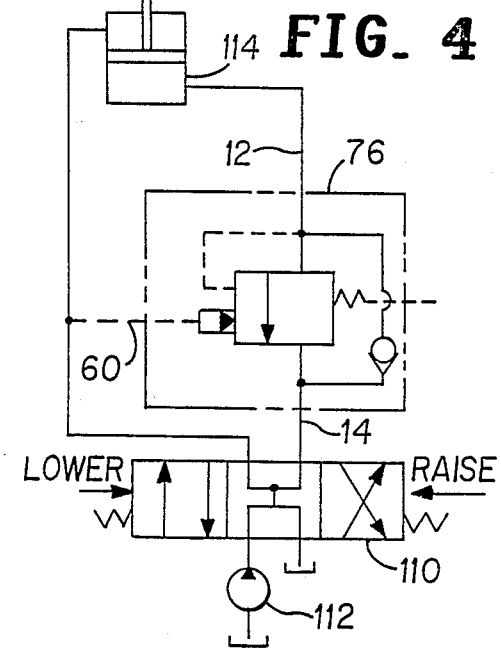
FIG_4
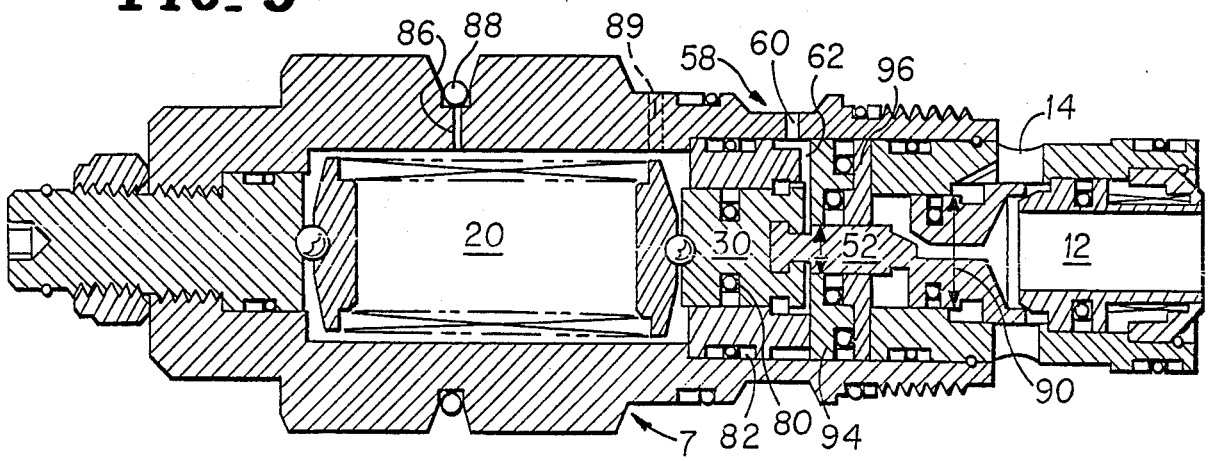
FIG_3

PRESSURE CONTROL VALVE

BACKGROUND OF THE INVENTION

1. Field of the Invention

This invention relates generally to hydraulic pressure control valves, and more particularly to such valves having an absolute set pressure which function as a direct-acting sequence valve and a vented counterbalance valve.

2. Description of Related Art

In U.S Pat. No. 4,742,846 I disclosed a direct-acting, differential piston relief valve which exhibits desirable operating characteristics of stability even at very low flows, lack of chattering during opening and low hysteresis. These same characteristics are desirable in pressure control valves used for other purposes. The direct-acting sequence valve and vented counterbalance valve of this invention not only share these operating characteristics, but also utilize many of the same components as the patented valve - making it economical to provide a family of valves.

The two pressure control valves of this invention are insensitive to downstream pressure. That is, they can be set to open at a desired upstream pressure, and this pressure will not vary regardless of the downstream pressure.

SUMMARY OF THE INVENTION

Pressure control valves are provided having a spring force reduction chamber between the piston head of the valve and the piston driver which is acted upon by the control spring. The spring force reduction chamber is connected to a passage through the piston head so that hydraulic fluid acting on the piston face will enter the spring force reduction chamber. An area of the piston head is acted on by the hydraulic fluid within this chamber to provide a closing force to partially offset the opening force produced by hydraulic pressure at the primary port on the piston face. This offsetting force permits the use of a smaller control spring in the valve so that a valve which is physically small can control hydraulic fluid at high pressures. The valves are made insensitive to pressure at the secondary port by having no net piston area exposed to secondary port pressure.

The direct-acting sequence valve has a passage to connect the control spring chamber to low constant reservoir pressure. This reference pressure is also applied to the valves net pressure area.

The counterbalance valve differs from the sequence valve by having a third port for introducing a pilot hydraulic pressure to a pilot chamber to assist the primary port hydraulic pressure in opening the valve. A vent to atmosphere passage is also provided to the spring chamber. In an alternative embodiment a fourth port may be provided to reservoir pressure so that a predictable, low pressure reference is available.

Both valves may further include a free reverse flow feature in which pressure at the secondary port can act to displace the primary port valve seat. Both valves also use the low friction features of the previously referred to U.S. Pat. No. 4,742,846.

It is therefore an object of this invention to provide a pressure control valve having an absolute set pressure.

It is also an object of this invention to provide a direct-acting sequence valve.

It is a further object of this invention to provide a counterbalance valve with a pilot assist.

In accordance with these and other objects, which will become apparent hereafter, the instant invention will now be described with reference to the accompanying drawings.

BRIEF DESCRIPTION OF THE DRAWINGS

FIG. 1 is a cross-section of a direct-acting sequence valve in accordance with the invention.

FIG. 2 is a symbolic drawing showing a direct-acting sequence valve in a hydraulic circuit.

FIG. 3 is a cross-section of a vented counterbalance valve with a pilot assist.

FIG. 4 is a symbolic drawing showing a vented counter-balance valve in a hydraulic circuit.

DETAILED DESCRIPTION OF THE INVENTION

Referring first to FIG. 1, direct-acting sequence valve 10 is depicted having primary port 12 which is connected to secondary port 14 when piston head 16 is displaced. Valve 10 has a main housing 18 which includes control spring chamber 20 in which control spring 22 is disposed. Spring guides 24 and 26 are positioned at the ends of control spring 22. Spring guide 24 has a rounded end, which may be a press fitted ball 28, which bears against a depression in piston driver 30. Spring guide 26 has a similar rounded end 32 which bears against a depression in spring chamber closure 34. Spring chamber closure 34 is made longitudinally adjustable by having a threaded portion 36 which can be screwed in and out to change the spring force. A T-shaped slot extends through piston driver 30 to receive and lock for longitudinal movement piston head extension 38.

Piston head 16 has a radially outwardly extending portion with a longitudinal annular extension 40. The inner edge of annular extension 40 forms a seal against valve seat 42. Passage 44 leads from secondary port 14 to chamber 46 so that the pressure in chamber 46 is the same as secondary port pressure. In addition, diameter 47 of piston head 16 is made the same as the seal diameter. This balance of areas makes the valve insensitive to secondary port pressure.

Direct-acting sequence valve 10 includes a spring force reduction chamber 48 which is connected by passage 50 through piston head 16 to primary port 12. The piston face area exposed to primary port hydraulic pressure creates an opening force which is partially offset by an area in spring force reduction chamber 48 which resists the opening force. The area which is not offset is represented by the minor diameter, indicated by arrows, of piston shaft 52.

It is important to have the diameter of the piston face which is acted upon by primary port pressure be equal to diameter 47 of the piston head, so that the diameter of piston shaft 52 can be selected as desired to provide an unbalanced hydraulic force which will provide the set pressure range for the valve which is balanced only by the control spring.

Low friction two way seals which include an O-ring and an annular ring of a low friction material such as Teflon are used as appropriate to provide a seal at sliding surfaces.

For some applications, a free reverse flow feature is desirable. That is, when secondary port pressure is sufficiently higher than primary port pressure, the valve should not restrict flow from the secondary port to the primary port. Valve seat 42 is slideably mounted in valve extension 54 and is normally held by spring 56 assisted by pressure at the primary port in sealing position. Spring 56 is selected to have a low spring constant so as to permit valve seat 42 to move open when pressure at secondary port 14 exceeds that at primary port 12 by the spring force plus the net force exerted on the seat by primary port pressure by a small, nominal amount. The primary port hydraulic fluid can enter the chamber which contains spring 56. This pressure acts on the seat wall surface in this chamber to produce a force which is only partially offset by pressure at the opposite end of the seat acting on a smaller wall area.

A third port is included which is defined by annular external groove 58. This third port is a drain to reservoir. This provides a necessary low, reference pressure so that valve opening pressure will be predictable. Passage 60 connects groove 58 to gap 62 between piston driver 30 and fixed partition 64. Consequently, primary port pressure acting on an area defined by the diameter of piston shaft 52 produces force which is opposed only by control spring 22.

The structure so far described is common to both the direct-acting sequence valve now being described and the counterbalance valve with pilot assist, to be described below.

Direct-acting sequence valve also includes passage 66 between spring chamber 20 and third reservoir port 58. In the sequence valve the passages to the third port are large enough to provide free drainage for hydraulic fluid to reservoir so as not to restrict valve opening.

Referring to FIG. 2, pump 68 supplies hydraulic fluid at the desired pressure to primary port 12 of direct-acting sequence valve 10. Check valve 70 represents the free reverse flow characteristic from secondary port 14 to primary port 12. Broken line 72 represents the fact that primary port pressure opposes spring force to open the valve. Broken line 74 indicates that only spring force opposes opening force—as indicated above, both the spring chamber and the gap 62 are connected to reservoir. A sequence of operations controlled by valves can be ordered by connecting the valves in parallel to the line supplied by pump 68 and assigning different set pressures to the valves. In this manner, as the pressure in the line increases, the valve with the lowest set pressure will open first. This minimum pressure always is assured in the line supplied by pump 68.

Referring now to FIG. 3, the vented counterbalance valve with pilot assist 76 will be described by pointing out those features which are not common to the direct-acting sequence valve. A pilot pressure port is provided in this valve using port 58 and passage 60 to introduce hydraulic fluid to act as a pilot pressure. This pressure is applied in gap 62 and acts on the large area of piston driver 30 in this gap as well as the small area of piston shaft 52 resulting in a net force to aid in opening the valve. Seals 80 and 82 serve to prevent loss of this hydraulic pressure by leakage into spring chamber 20. Spring chamber 20 is provided with vent passage 86 which has O-ring 88 covering the opening to prevent contaminents from entering the spring chamber. Vent passage 86 is designed to vent to atmosphere. An alternate embodiment substitutes fourth port 89 (shown in broken lines) which is piped directly to reservoir for vent passage 86.

It is important in both valves to have the diameter of the piston face which is acted upon by the primary port pressure be equal to the diameter 90 of the piston head. The diameter of piston shaft 52 may then be conveniently changed as desired to provide an unbalanced hydraulic force which will provide the set pressure range for the valve - balanced by the control spring. The internal diameters of rings 94 and 96 are, of course, made to fit closely to the diameter of piston shaft 52.

Referring now to FIG. 4, with directional control valve 110 shifted to the RAISE position, pump 112 flow is directed to secondary port 14 of counterbalance valve 76, and oil will free flow through the check valve to primary port 12 and then to cylinder 114 to raise load W.

When directional control valve 110 is centered, the check valve closes. The load is held by counterbalance valve 76 as long as the valve pressure setting is higher than the load pressure applied at primary port 12.

When directional control valve 110 is shifted to the LOWER position, pump 112 oil flow is directed to the piston rod side of cylinder 114 and also to pilot port 60 of counterbalance valve 76. The net force exerted by this pilot pressure assists the load pressure in opening the valve. Since some pressure is always required at the pilot port to keep the valve open, the load can never "run away" from the pump. Flow from the cylinder is restrained, preventing cavitation which would occur if the load ran ahead of the pump. When the directional control valve is again centered, pilot pressure goes to zero and the counterbalance valve closes, smoothly decelerating and locking the load.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A pressure control valve having an absolute set pressure comprising:

a longitudinally extending valve housing;

a valve seat defining a primary port at one end of said housing;

a control spring chamber in said housing;

a control spring in said control spring chamber;

a longitudinally adjustable spring chamber closure at the other end of said housing closing one end of said control spring chamber;

a piston assembly mounted for longitudinal movement in said housing;

said piston assembly having a piston driver, a piston head and a piston shaft;

said piston driver disposed at the other end of said control spring chamber;

said piston head having a first diameter and a longitudinal annular extension;

said longitudinal annular extension of said piston head having an inner edge forming a seal with said valve seat when said valve is closed;

said seal having a diameter equal to said first diameter of said piston head;

a secondary port through said housing adjacent to said valve seat, whereby a passage is provided from said primary port to said secondary port when said valve is open;

said longitudinal annular extension of said piston head having an annular face extending from said inner edge exposed to hydraulic fluid in said secondary port;

said piston shaft connecting said piston driver and said piston head;

an annular spring force reduction chamber between said piston driver and said piston head; and a passage between said spring force reduction chamber and said primary port, whereby hydraulic fluid at primary port pressure can enter said spring force reduction chamber and partially offset the force exerted by the hydraulic fluid at said primary port.

2. A pressure control valve in accordance with claim 1 wherein:

said piston head has an area oppositely disposed from said annular face and equal in size to said annular face also exposed to hydraulic fluid from said secondary port, whereby forces exerted by hydraulic fluid at said secondary port will be equal and opposite.

3. A pressure control valve in accordance with claim 1 further including:

a fixed leakproof partition between said piston driver and said piston head surrounding said piston shaft;

a gap between said partition and said piston driver; and a third port connected to said gap.

4. A pressure control valve in accordance with claim 1 wherein:

said valve seat is mounted for longitudinal movement in said valve housing;

a spring biases said valve seat to seating position; and hydraulic pressure at said secondary port will displace said valve seat from seating position, whereby said valve has a free reverse flow characteristic.

5. A pressure control valve in accordance with claim 3 further including:

a passage between said control spring chamber and said third port.

6. A pressure control valve in accordance with claim 5 further including:

a first spring guide disposed between said control spring and said spring closure chamber;

a second spring guide disposed between said control spring and said piston driver;

said first and second spring guides having a rounded surface abutting said spring closure chamber and said piston driver, respectively.

7. A pressure control valve in accordance with claim 3 further including:

a passage through said housing from said control spring chamber; and a closure releasably closing said passage through said housing.

8. A pressure control valve in accordance with claim 7 further including:

a first spring guide disposed between said control spring and said spring closure chamber;

a second spring guide disposed between said control spring and said piston driver;

said first and second spring guides having a rounded surface abutting said spring closure chamber and said piston driver, respectively.

9. A pressure control valve comprising:

a longitudinally extending valve housing;

a piston assembly mounted for longitudinal movement in said housing;

said piston assembly having a piston head at one end, a piston driver at the other end and a piston shaft connecting said piston head and said piston driver;

a valve seat mounted in said housing adjacent to said piston head;

said valve seat defining a primary port of said valve at one end of said valve housing;

a fixed partition between said piston head and said piston driver surrounding said piston shaft;

a spring force reduction chamber between said piston head and said fixed partition;

a passage between said spring force reduction chamber and said primary port, whereby hydraulic fluid at primary port pressure can enter said spring force reduction chamber and partially offset the hydraulic force on said piston head;

a control spring chamber in said housing;

a control spring in said control spring chamber;

a longitudinally adjustable spring chamber closure at one end of said control spring;

said piston driver at the other end of said control spring;

a pressure relieving port connected to said spring chamber, whereby hydraulic pressure in said spring chamber will be negligible; and a secondary port in said housing adjacent to said valve seat, whereby a passage is provided from said primary port to said secondary port when said valve is open.

10. A pressure control valve in accordance with claim 9 wherein:

said piston head has a first area exposed to pressure in said secondary port tending to cause said valve to open;

said piston head has a second, equal area exposed to pressure in said secondary port tending to cause said valve to close, whereby said valve is insensitive to secondary port pressure.

11. A pressure control valve in accordance with claim 9 further including:

a third port;

a gap between said fixed partition and said piston driver; and a passage connecting said gap and said third port.

12. A pressure control valve in accordance with claim 11 further including:

a passage between said control spring chamber and said third port.

13. A pressure control valve in accordance with claim 12 wherein:

said valve seat is mounted for longitudinal movement in a valve extension;

a spring biases said valve seat to seating position; and hydraulic pressure at said secondary port will displace said valve seat from seating position, whereby said valve has a free reverse flow characteristic.

14. A pressure control valve in accordance with claim 11 further including:

a passage through said valve housing from said control spring chamber; and a closure releasably closing said passage though said housing.

15. A pressure control valve in accordance with claim 14 wherein:

said valve seat is mounted for longitudinal movement in a valve extension;

a spring biases said valve seat to seating position; and hydraulic pressure at said secondary port will displace said valve seat from seating position, whereby said valve has a free reverse flow characteristic.

16. A pressure control valve in accordance with claim 11 further including:

a first spring guide disposed between said control spring and said spring closure chamber;
a second spring guide disposed between said control spring and said piston driver;
said first and second spring guides having a rounded surface abutting said spring closure chamber and said piston driver, respectively.

* * * * *